United States Patent
Ren et al.

(10) Patent No.: US 7,031,972 B2
(45) Date of Patent: Apr. 18, 2006

(54) ALGORITHMS FOR BLOCK-LEVEL CODE ALIGNMENT OF SOFTWARE BINARY FILES

(75) Inventors: Liwei Ren, Alviso, CA (US); Jinsheng Gu, Alviso, CA (US); Luosheng Peng, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 294 days.

(21) Appl. No.: 10/624,704

(22) Filed: Jul. 21, 2003

(65) Prior Publication Data
US 2005/0021572 A1    Jan. 27, 2005

(51) Int. Cl.
*G06F 17/00* (2006.01)
*G06F 17/30* (2006.01)

(52) U.S. Cl. .......................................... 707/101; 707/7
(58) Field of Classification Search .................. 707/1, 707/2, 7, 100, 101, 202, 203
See application file for complete search history.

(56) References Cited

U.S. PATENT DOCUMENTS

| | | | |
|---|---|---|---|
| 5,479,654 A | 12/1995 | Squibb | |
| 5,574,906 A | 11/1996 | Morris | |
| 5,742,905 A | 4/1998 | Pepe | |
| 5,806,078 A | 9/1998 | Hug | |
| 5,813,017 A | 9/1998 | Morris | |
| 5,832,520 A * | 11/1998 | Miller | 707/203 |
| 6,018,747 A | 1/2000 | Burns | |
| 6,052,531 A | 4/2000 | Waldin | |
| 6,088,694 A | 7/2000 | Burns | |
| 6,167,258 A | 12/2000 | Schmidt | |
| 6,233,589 B1 | 5/2001 | Balcha | |
| 6,269,456 B1 | 7/2001 | Hodges | |
| 6,327,671 B1 | 12/2001 | Menon | |
| 6,349,311 B1 | 2/2002 | Sobel | |
| 6,374,250 B1 * | 4/2002 | Ajtai et al. | 707/101 |
| 6,401,239 B1 | 6/2002 | Miron | |
| 6,442,660 B1 | 8/2002 | Henerlau | |
| 6,466,999 B1 * | 10/2002 | Sliger et al. | 710/68 |
| 6,470,329 B1 | 10/2002 | Livschitz | |
| 6,526,574 B1 | 2/2003 | Jones | |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

*Primary Examiner*—Uyen Le
(74) *Attorney, Agent, or Firm*—Courtney Staniford & Gregory LLP (57) ABSTRACT

A file differencing and updating system is provided that includes a file differencing component and a file updating component. The file differencing component, or file differencing engine, generates a difference file in a first processor-based or computer system from an original or old version and a new version of an electronic file. Generation of the difference files includes processing to reduce the number of file changes introduced by code block swaps. The processing uses an alignment algorithm, which includes a sorting algorithm, to align the code blocks of the original version in the same order as those of the new version, thereby eliminating the increase in the number of byte-level file differences due to code block swaps. During the alignment operations, the block movements are dynamically recorded at a minimum cost level and encoded for transmission to the file updating component for use in code recovery.

10 Claims, 8 Drawing Sheets

U.S. PATENT DOCUMENTS

| | | | |
|---|---|---|---|
| 6,535,894 B1 | 3/2003 | Schmidt | |
| 6,542,906 B1 | 4/2003 | Korn | |
| 6,594,822 B1 | 7/2003 | Schweitz | |
| 6,615,404 B1 | 9/2003 | Garfunkel | |
| 6,651,190 B1 | 11/2003 | Worley | |
| 6,671,703 B1 | 12/2003 | Thompson | |
| 6,671,757 B1 | 12/2003 | Multer | |
| 6,694,336 B1 | 2/2004 | Multer | |
| 6,836,657 B1 * | 12/2004 | Ji et al. | 455/419 |
| 2001/0029178 A1 | 10/2001 | Criss | |
| 2001/0049263 A1 | 12/2001 | Zhang | |
| 2002/0099726 A1 | 7/2002 | Crudele | |
| 2002/0129107 A1 | 9/2002 | Loughran | |
| 2003/0110253 A1 | 6/2003 | Anuszczyk | |
| 2003/0200207 A1 | 10/2003 | Dickinson | |
| 2003/0212712 A1 | 11/2003 | Gu | |
| 2004/0031027 A1 * | 2/2004 | Hiltgen | 717/170 |
| 2004/0062130 A1 | 4/2004 | Chiang | |
| 2004/0092255 A1 | 5/2004 | Ji | |
| 2004/0098361 A1 | 5/2004 | Peng | |
| 2004/0098413 A1 | 5/2004 | Peng | |
| 2004/0098420 A1 | 5/2004 | Peng | |
| 2004/0098421 A1 | 5/2004 | Peng | |
| 2004/0098427 A1 * | 5/2004 | Peng | 707/205 |
| 2004/0111427 A1 | 6/2004 | Gu | |
| 2004/0220980 A1 | 11/2004 | Forster | |
| 2005/0010576 A1 * | 1/2005 | Ren et al. | 707/100 |
| 2005/0010870 A1 * | 1/2005 | Gu et al. | 715/540 |

OTHER PUBLICATIONS

Ajtai, Miklos et al., "Compactly encoding unstructured inputs with differential compression", IBM Almaden Research Center, 44 pages, no date.

Burns, Randal C. et al., "In-place reconstruction of delta compressed files", IBM Almaden Research Center, 9 pages, no date.

Burns, Randal et al., "In-place reconstruction of version differences", IBM Almaden Research Center, 25 pages, no date.

Ziv, Jacob et al., "A universal algorithm for sequential data compression", IEEE Transactions on Information Theory, vol. IT-23, No. 3, May 1977.

* cited by examiner

ALGORITHMS FOR BLOCK-LEVEL CODE ALIGNMENT OF SOFTWARE BINARY FILES

RELATED APPLICATION

This application relates to U.S. patent application Ser. No. 10/146,545, filed May 13, 2002 now U.S. Pat. No. 6,925,467, and U.S. patent application Ser. No. 10/616,615, filed Jul. 9, 2003.

TECHNICAL FIELD

The disclosed embodiments relate to updating of electronic files using difference files.

BACKGROUND

Software running on a processor, microprocessor, and/or processing unit to provide certain functionality often changes over time. The changes can result from the need to correct bugs, or errors, in the software files, adapt to evolving technologies, or add new features, to name a few. In particular, embedded software components hosted on mobile processing devices, for example mobile wireless devices, often include numerous software bugs that require correction. Software includes one or more files in the form of human-readable American Standard Code for Information Interchange (ASCII) plain text files or binary code. Software files can be divided into smaller units that are often referred to as modules or components.

Portable processor-based devices like mobile processing devices typically include a real-time operating system (RTOS) in which all software components of the device are linked as a single large file. Further, no file system support is typically provided in these mobile wireless devices. In addition, the single large file needs to be preloaded, or embedded, into the device using a slow communication link like a radio, infrared, or serial link.

Obstacles to updating the large files of mobile processing devices via slow communication links include the time, bandwidth, and cost associated with delivering the updated file to the device. These obstacles arise because, in many cases, the differences between the new and original versions of the executable files are more complex than the differences between their corresponding source files.

These complex differences between the new and original file versions arise in part because small changes in the source files often introduce major changes throughout the executable files. As an example, one type of change introduced in the executable files is a logical change that includes source code changes arising from source code line deletion from the original file, source code line addition to the new file, and source code line modifications. The logical changes also include data initialization changes, resource and configuration file changes, and dictionary changes.

Another type of introduced change, often referred to as a secondary change includes address changes, pointer target address changes, and changes in address offsets caused by address shifts resulting from the logical changes or code block swapping and generated by the software compiler/linker utilities.

Yet another type of introduced change includes byte-level code changes generated by the compiler/linker utilities not stemming from changes in the code logic or address shifts. For example, an instruction in the original version uses register R1, but the same instruction uses register R3 in the new version when, for example, register R1 is not available.

One typical solution to the problem of delivering large files to mobile processing devices includes the use of compression. While a number of existing compression algorithms are commonly used, often, however, even the compressed file is too large for download to a device via a slow, costly, narrowband communication link.

Another typical solution for updating files uses difference programs to generate a description of how a revised file differs from an original file. There are available difference programs that produce such difference data. However, as with compression, the difference files produced using these difference programs can sometimes be too large for efficient transfer via the associated communication protocols.

In the drawings, the same reference numbers identify identical or substantially similar elements or acts. To easily identify the discussion of any particular element or act, the most significant digit or digits in a reference number refer to the Figure number in which that element is first introduced (e.g., element 106 is first introduced and discussed with respect to FIG. 1).

DETAILED DESCRIPTION

Devices and methods for generating difference files between two versions of an electronic file, herein referred to as file differencing, are described in detail herein. Generation of the difference files includes processing by components of an algorithm and/or optimizing system to reduce the number of file changes introduced by code block swaps. The components use an alignment algorithm also referred to as an alignment program or routine, which includes a sorting algorithm, to reduce file changes introduced by code block swaps between two different versions of an electronic file. The components generate a list that includes encoded information of the code block moves. The alignment algorithm reduces/removes the differences among the versions required to be encoded in the delta file, thereby resulting in an overall performance gain.

Figure 1:
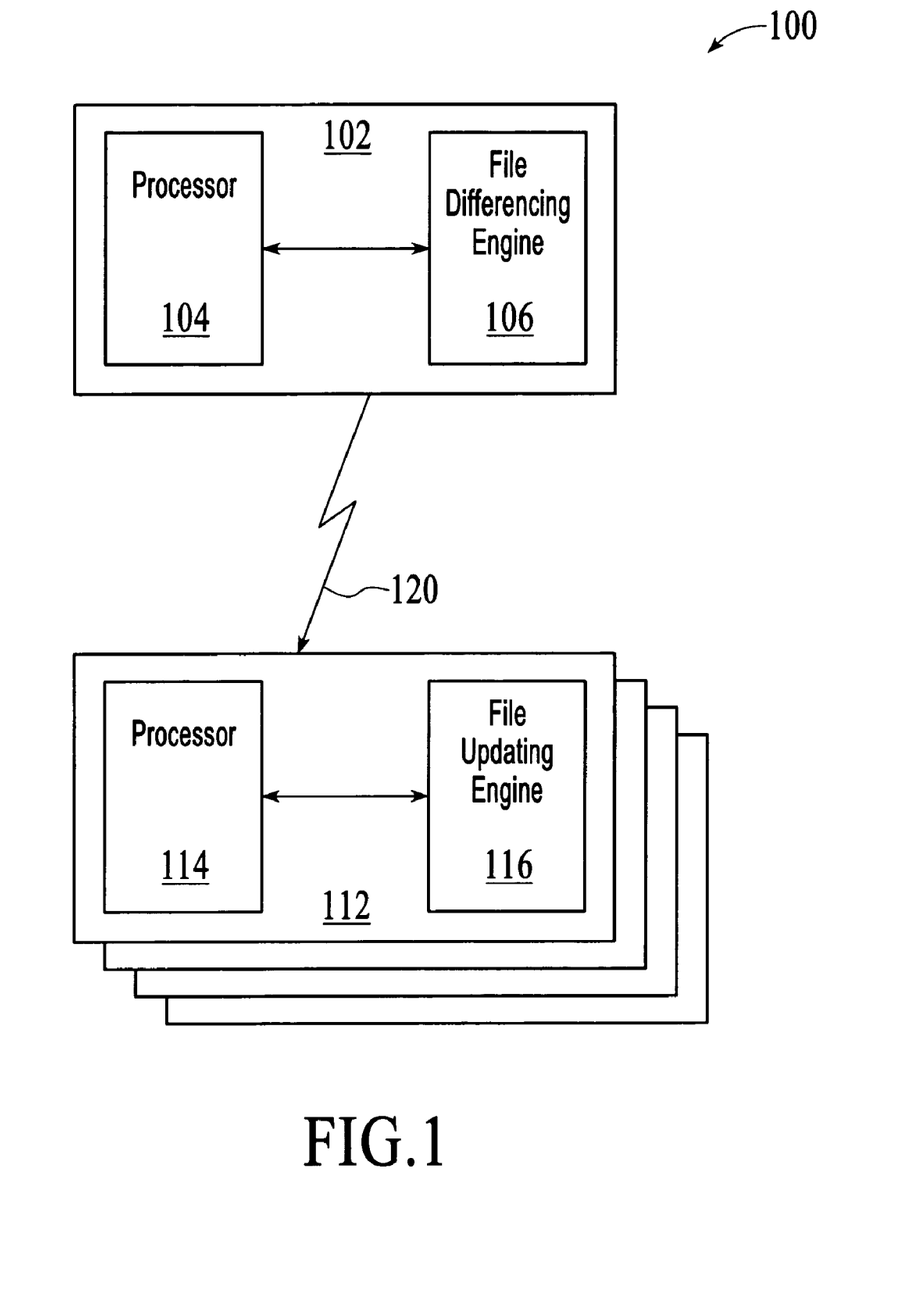
FIG. 1 is a block diagram showing a file differencing and updating system, under an embodiment.

FIG. 1 is a block diagram showing a file differencing and updating system 100, under an embodiment. Generally, the file differencing and updating system 100 includes a file differencing component 106 and a file updating component 116. The differencing component 106, referred to herein as the file differencing engine 106, or differencing engine 106, generates a difference file in a first processor-based or computer system 102 from an original or old version and a new version of an electronic file. The updating component 116, referred to herein as the file updating engine 116, or updating engine 116, generates a copy of the new file on a second processor-based or computer system 112 using the difference file and the hosted copy of the original file.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 112 communicate via a communication path 120. These computer systems 102 and 112 include any collection of computing components and devices operating together, as is known in the art. The computer systems 102 and 112 can also be components or subsystems within a larger computer system or network.

The first computer system includes at least one processor 104 coupled to at least one file differencing engine 106, described in detail below. The processor 104 and file differencing engine 106 can also be coupled among any number of components (not shown) known in the art, for example buses, controllers, memory devices, and data input/output (I/O) devices, in any number of combinations.

The second computer system includes at least one processor 114 coupled to at least one file updating engine 116, described in detail below. The processor 114 and file updating engine 116 can also be coupled among any number of components (not shown) known in the art, for example buses, controllers, memory devices, and data input/output (I/O) devices, in any number of combinations. The file differencing engine 106 and the file updating engine 116 form the file differencing and updating system 100.

The communication path 120 includes any medium by which files are communicated or transferred between the computer systems 102 and 112. Therefore, this path 120 includes wireless connections, wired connections, and hybrid wireless/wired connections. The communication path 120 also includes couplings or connections to networks including local area networks (LANs), metropolitan area networks (MANs), wide area networks (WANs), proprietary networks, interoffice or backend networks, and the Internet. Furthermore, the communication path 120 includes removable fixed mediums like floppy disks, hard disk drives, and CD-ROM disks, as well as telephone lines, buses, and electronic mail messages.

Generation of the difference files includes processing by components of the differencing engine 106 to reduce the number of file changes introduced by code block swaps. The components of an embodiment include an alignment algorithm that makes use of a sorting algorithm to reduce file changes introduced by code block swaps between two different versions of an electronic file, as described below.

Figure 2:
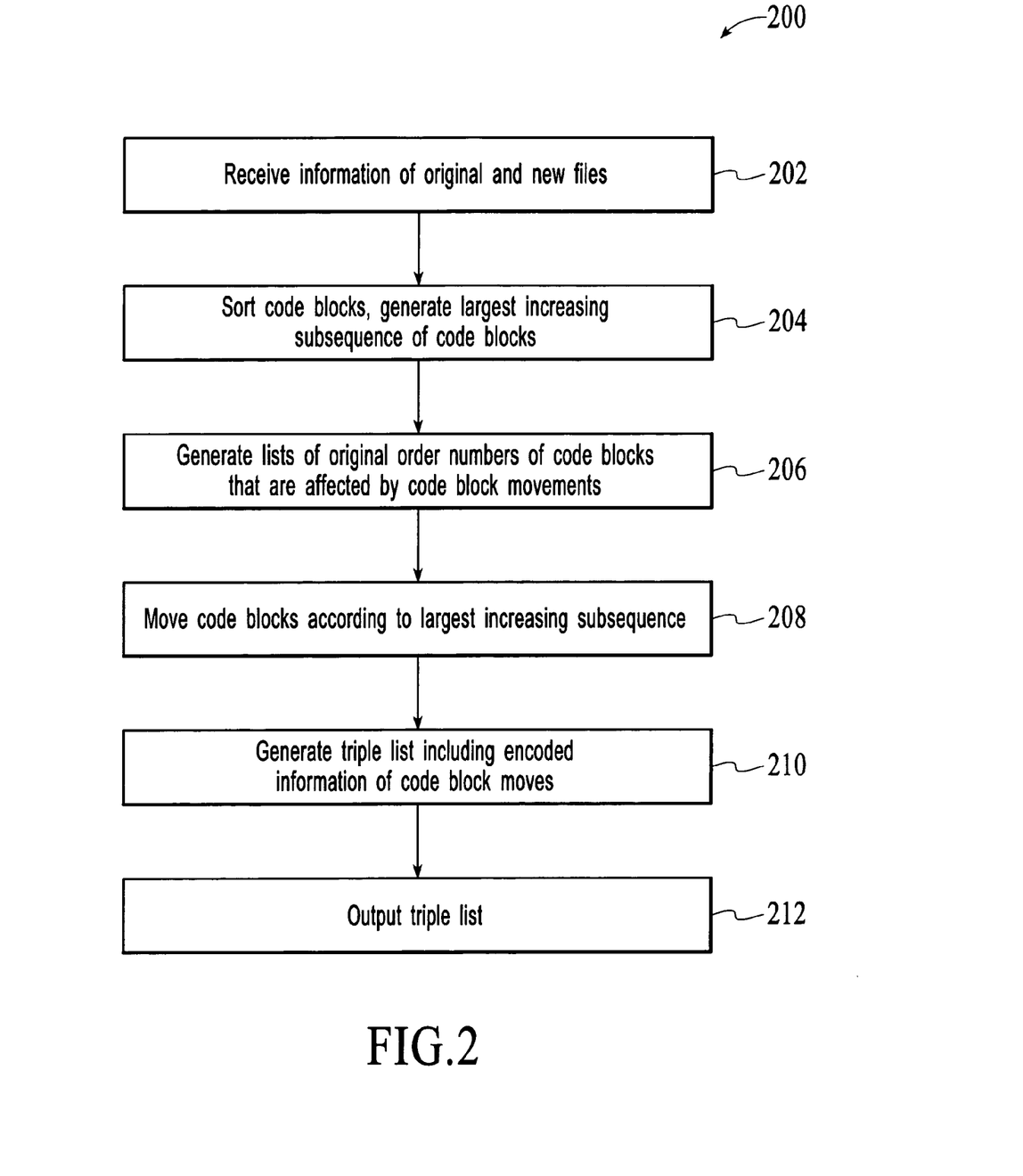
FIG. 2 is a flow diagram of an algorithm for use in reducing file changes introduced by code block swaps between two different versions of an electronic file, under an embodiment.

FIG. 2 is a flow diagram 200 for reducing file changes introduced by code block swaps between two different versions of an electronic file, for use by components of a differencing engine of an embodiment. The functions of the flow diagram 200 can be embodied in and/or distributed among any number of components of the file differencing engine 106 and/or the first computer system 102 (FIG. 1), but are not so limited. Generally, the differencing engine receives information of the original and new files, at block 202. Using the received information, at block 204, the differencing engine sorts the code blocks, and generates a largest increasing subsequence of code blocks. Lists are next generated that include the original order numbers of code blocks that are affected by code block movements, at block 206. The differencing engine moves code blocks of the original file according to the largest increasing subsequence of code blocks, at block 208, so that the code blocks of the original file are in the same order as the counterpart code blocks in the new file. The differencing engine generates a list that includes encoded information of the code block moves, at block 210, and outputs the list, at block 212. The list of encoded information is referred to as a triple list, but is not so limited.

A code block can be defined using its start address and size as [startAddr, size]. Given a sequence of code blocks, the code blocks can be listed in an ascending order according to the start addresses. A software upgrade that upgrades an original version of a file, referred to herein as the original version V1, to a new version of a file, referred to herein as the new version V2, frequently results in a change in the order of the code blocks between the original V1 and the new V2 versions. Consequently, changing the order of the code blocks, referred to herein as code block swaps or block swaps, typically results in an increase in the number of byte-level file differences between the original and the new versions.

Aligning the code blocks of the original version V1 in the same order as those of the new version V2 using the alignment algorithm described below eliminates/reduces this increase in the number of byte-level file differences due to the block swaps. During the alignment operations, the block movements are dynamically recorded at a minimum cost level and encoded for transmission to the file updating engine for use in code recovery.

Figure 3:
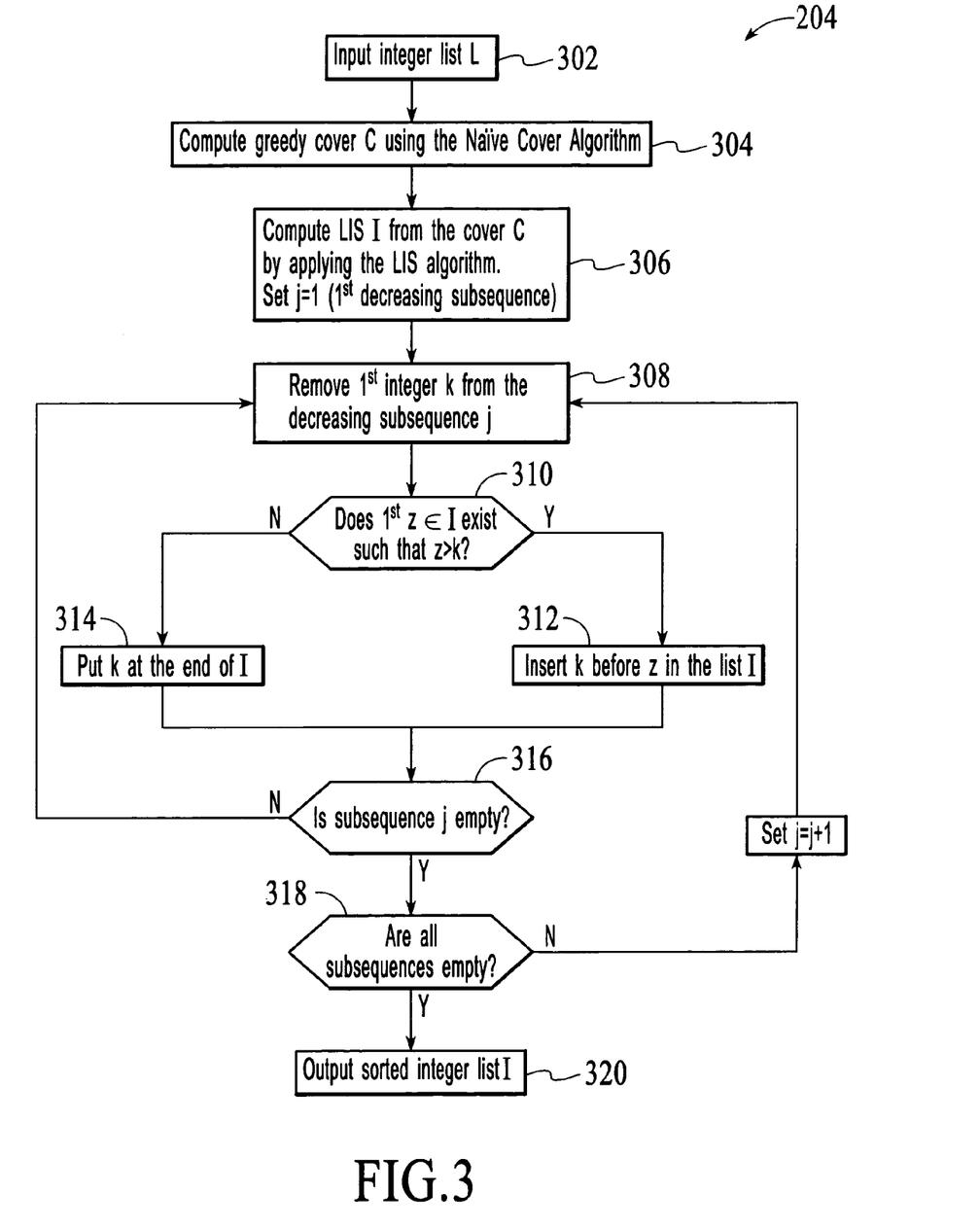
FIG. 3 is a flow diagram of a sorting algorithm for use in reducing file changes introduced by code block swaps between two different versions of an electronic file, under an embodiment.

FIG. 3 is a flow diagram of a sorting algorithm 204, under an embodiment. While the alignment algorithm 400 described below with reference to FIG. 4 makes use of this sorting algorithm 204 for use in reducing file changes introduced by code block swaps between two different versions of an electronic file, the sorting algorithm 204 is not so limited because it can generally be used in other systems that perform sorting functions.

Typically, a sorting algorithm arranges a sequence of items into some order according to prespecified criteria. For purposes of this example, the orderable items are integers unless specified otherwise. As an example of ordering items, given a list of integers such as 1, 6, 8, 3, 4, 19, 34, the list becomes 1, 3, 4, 6, 8, 19, 34 when ordered according to ascending value.

In describing the sorting algorithm, use is made of a number of definitions, theorems, and algorithms, as described by D. Gusfield in "Algorithms on Strings, Trees, and Sequences: Computer Science and Computational Biology," ("the Gusfield reference") Cambridge (1997). A first definition defines the variable L to be a list of n integers, not necessarily distinct. An increasing subsequence of L is a subsequence of L in which values strictly increase when moving through the string from left to right. The longest increasing subsequence is the longest subsequence among all increasing subsequences of L, and is referred to as the longest or largest increasing subsequence (LIS).

A second definition defines a decreasing subsequence of L as a subsequence of L in which the integers are non-increasing when moving through the list from left to right. A third definition defines a cover of L to be a set of decreasing subsequences of L that includes all integers of L.

Further, the size of the cover is the number of decreasing subsequences in the cover, and a smallest cover is the cover with the smallest size among a group of covers.

The sorting algorithm of an embodiment also uses a first theorem which states that if I is an increasing subsequence of L having a length equal to the size of a cover (referred to herein as C) of L, then I is the longest increasing subsequence of L and C is the smallest cover of L.

In addition to the definitions and the theorem described above, the sorting algorithm of an embodiment makes use of two algorithms. These two algorithms include a Naïve Cover Algorithm and a Largest Increasing Subsequence (LIS) Algorithm, described below.

The Naïve Cover Algorithm, when starting from the left-most position of L, examines each successive integer in L and places the integer at the end of the first (left-most) decreasing subsequence that it can extend. If there are no decreasing subsequences that can be extended, the Naïve Cover Algorithm starts a new decreasing subsequence to the right of the existing decreasing subsequences. The set of all the obtained decreasing subsequences is referred to as the greedy cover.

As an example, let L={5, 6, 2, 3, 4, 1, 10, 12, 11, 13, 14, 16, 15, 18, 17, 29, 30, 22, 24, 25, 26}. Application of the Naïve Cover Algorithm results in greedy cover C as

| 5 | 6 | 4 | 10 | 12 | 13 | 14 | 16 | 18 | 29 | 30 | 25 | 26 |
|---|---|---|----|----|----|----|----|----|----|----|----|----|
| 2 | 3 |   |    | 11 |    |    | 15 | 17 | 22 | 24 |    |    |
| 1 |   |   |    |    |    |    |    |    |    |    |    |    |

Each column is a decreasing subsequence, and the greedy cover C includes all columns.

The sorting algorithm of an embodiment also uses a second theorem which states that there is an increasing subsequence I of L including exactly one integer from each decreasing subsequence in the greedy cover C. Therefore, I is the LIS, and C is the smallest cover.

In operation, the LIS Algorithm begins by setting the variable j equal to the number of subsequences in the greedy cover C. Also, the variable I is set as the empty list. Next, select any integer x in subsequence j and place it in the left-most (front) position of list I, and remove x from subsequence j. When j is greater than 1 the LIS Algorithm performs the following operations sequentially: scan down from the top of subsequence j−1 and identify the first integer y that is smaller than x; set x to y and j to j−1; and place x in the left-most (front) position of the list I, and remove x from subsequence j.

Returning to the example described above with reference to the Naïve Cover Algorithm, a LIS is obtained from the greedy cover C, where I represents the LIS as:

I={2, 3, 4, 10, 12, 13, 14, 16, 18, 22, 24, 25, 26}.

Returning to FIG. 3, the sorting algorithm described herein looks similar to the classic insertion sorting algorithm in the insertion manner. However, in contrast to the classic insertion sorting algorithm which begins operation with an empty list L, the sorting algorithm of an embodiment starts sorting operations on a LIS. Thus, use of the sorting algorithm of an embodiment results in fewer insertion operations when sorting. The reduced number of insertion operations, when applied to code block swaps, increases the efficiency of difference file generation by reducing the number of operations required to be encoded in the difference file, as described below.

Operation of the sorting algorithm of an embodiment begins when the sorting algorithm receives an input integer list L, at block 302. The sorting algorithm generates the greedy cover C by applying the Naïve Cover Algorithm to the list L, at block 304, as described above. The sorting algorithm next generates the LIS, represented by the variable I, by applying the LIS Algorithm to the greedy cover C, at block 306, and sets j (subsequence counter) equal to the value one.

The sorting algorithm continues by removing the first integer k from the decreasing subsequence j, at block 308. Next, a determination is made as to whether the first member z∈I exists such that z is larger than k, at block 310. When the first member z∈I exists such that z is larger than k, the sorting algorithm inserts k before z as a new member of the list I, at block 312. When first member z∈I does not exist such that z is larger than k, the sorting algorithm places k at the end of the list I, at block 314. The sorting algorithm repeats the evaluation of each integer k of the decreasing subsequence j until subsequence j is empty, at block 316. The sorting algorithm evaluates each decreasing subsequence j in the greedy cover C until all decreasing subsequences in C are empty, at block 318. When all subsequences are empty the sorting algorithm outputs the sorted integer list I, at block 320.

As another operational example of the sorting algorithm of an embodiment, with reference to FIG. 3, let L={5, 6, 2, 3, 4, 1, 10, 12, 11, 13, 14, 16, 15, 18, 17, 29, 30, 22, 24, 25, 26}. A greedy cover C is generated at block 304 as

| 5 | 6 | 4 | 10 | 12 | 13 | 14 | 16 | 18 | 29 | 30 | 25 | 26 |
|---|---|---|----|----|----|----|----|----|----|----|----|----|
| 2 | 3 |   |    | 11 |    |    | 15 | 17 | 22 | 24 |    |    |
| 1 |   |   |    |    |    |    |    |    |    |    |    |    |

Application of the LIS Algorithm to the greedy cover C at block 306 produces an LIS represented by the variable I as

I={2, 3, 4, 10, 12, 13, 14, 16, 18, 22, 24, 25, 26}, and the greedy cover C becomes:

| 5 | 6 | 11 | 15 | 17 | 29 | 30 |
|---|---|----|----|----|----|----|
| 1 |   |    |    |    |    |    |

The first decreasing subsequence in C is now {5, 1}. The first integer 5 is then removed from the subsequence at block 308 and, because the first member of I that is larger than 5 is 10 at block 310, I becomes

I={2, 3, 4, 5, 10, 12, 13, 14, 16, 18, 22, 24, 25, 26}, at block 312.

Continuing, the first subsequence in C is now {1} and, because the first subsequence is not empty, operation returns to block 308 where the integer 1 is removed from the first subsequence. Because the first member of I that is larger than 1 is 2 at block 310, I becomes

I={1, 2, 3, 4, 5, 10, 12, 13, 14, 16, 18, 22, 24, 25, 26} at block 312.

Continuing, the first subsequence in C is now empty, so the sorting algorithm advances operations to the second decreasing subsequence {6} at block 318, and operation returns to block 308. Operation of the sorting algorithm continues in this manner, and ceases operation when all decreasing subsequences are empty, at which point I is I={1, 2, 3, 4, 5, 6, 10, 11, 12, 13, 14, 15, 16, 17, 18, 22, 24, 25, 26, 29, 30}.

Figure 4A:
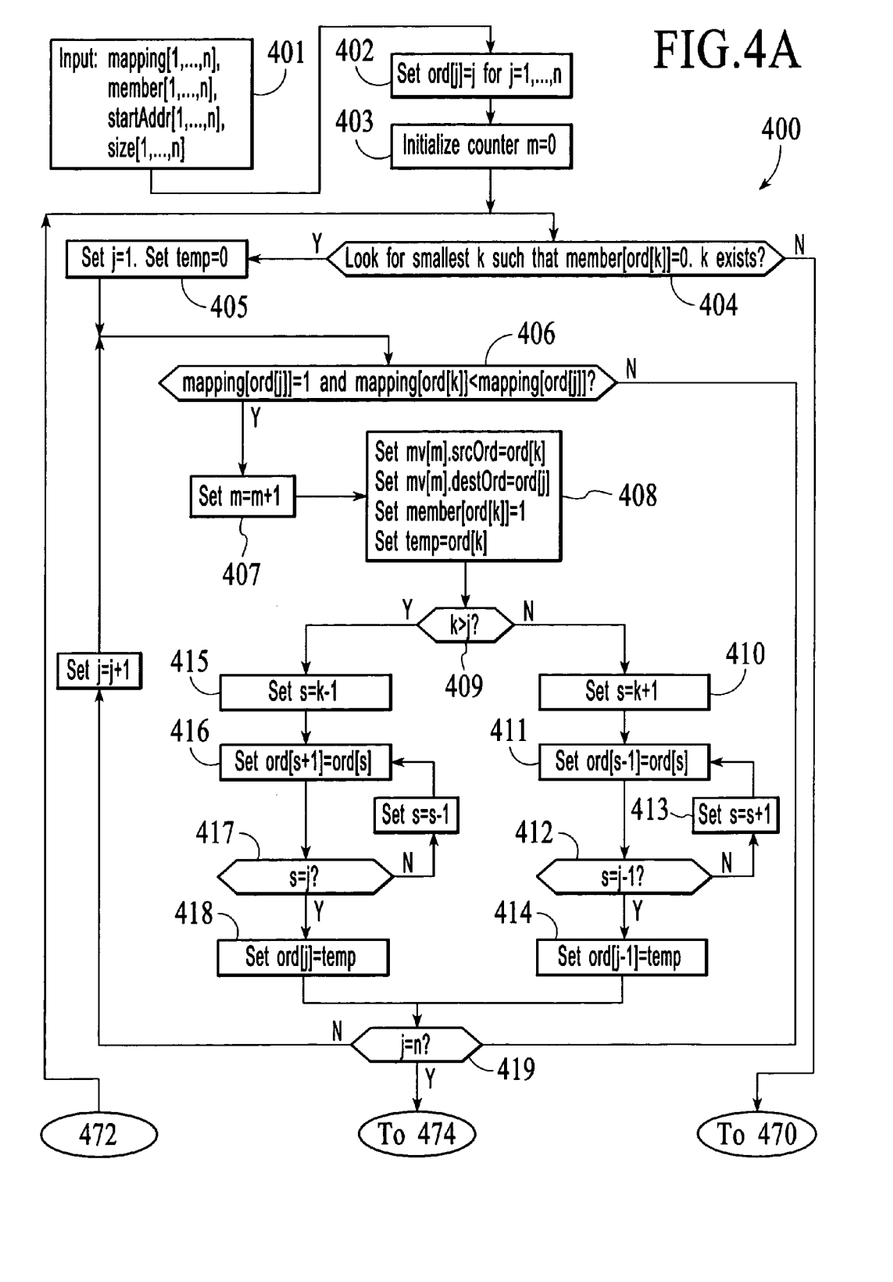
FIGS. 4A, 4B, and 4C form a flow diagram of an alignment algorithm for use in reducing file changes introduced by code block swaps between two different versions of an electronic file, under the embodiment of FIGS. 2 and 3.
Figure 4B:
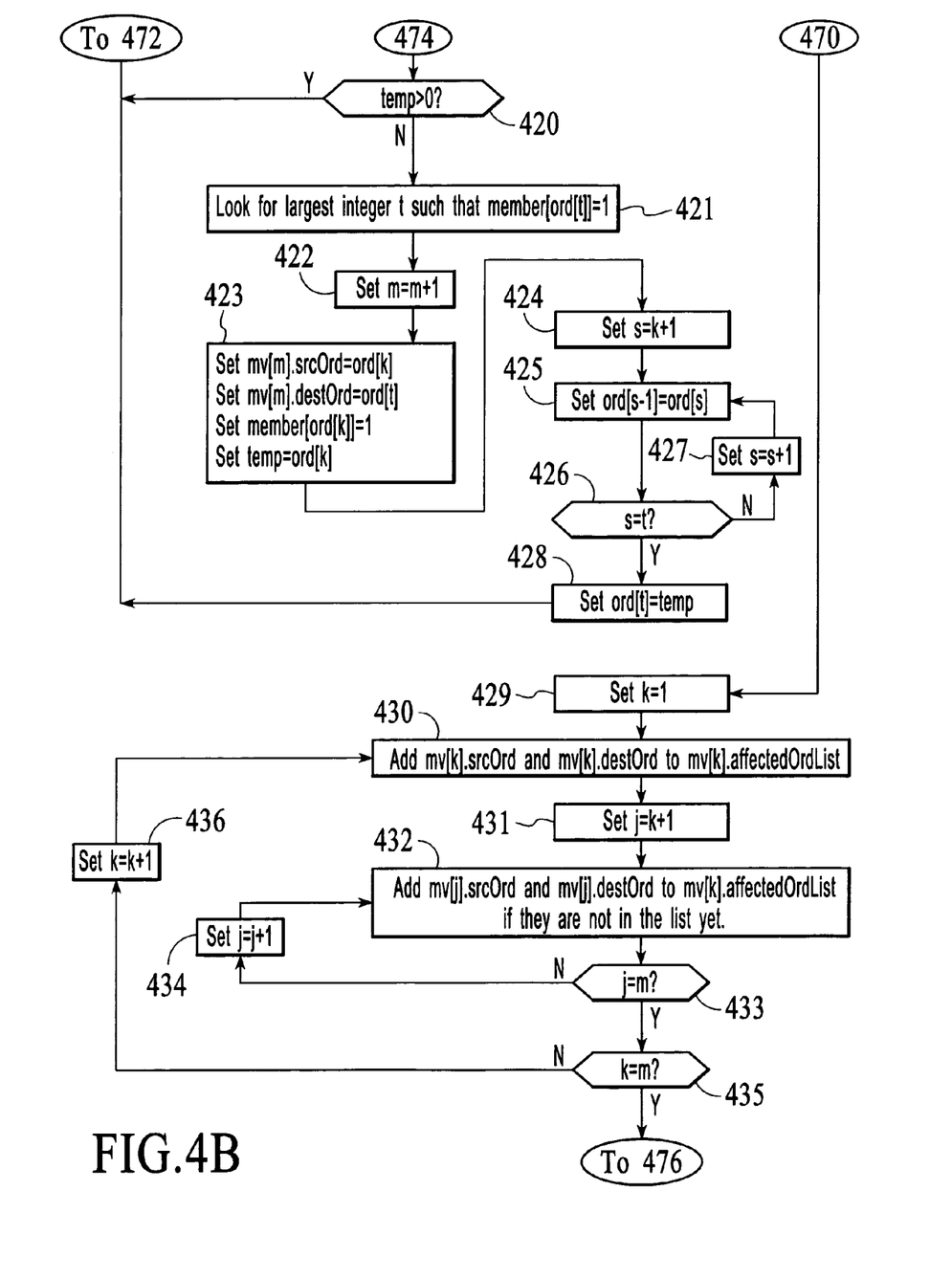
Figure 4C:
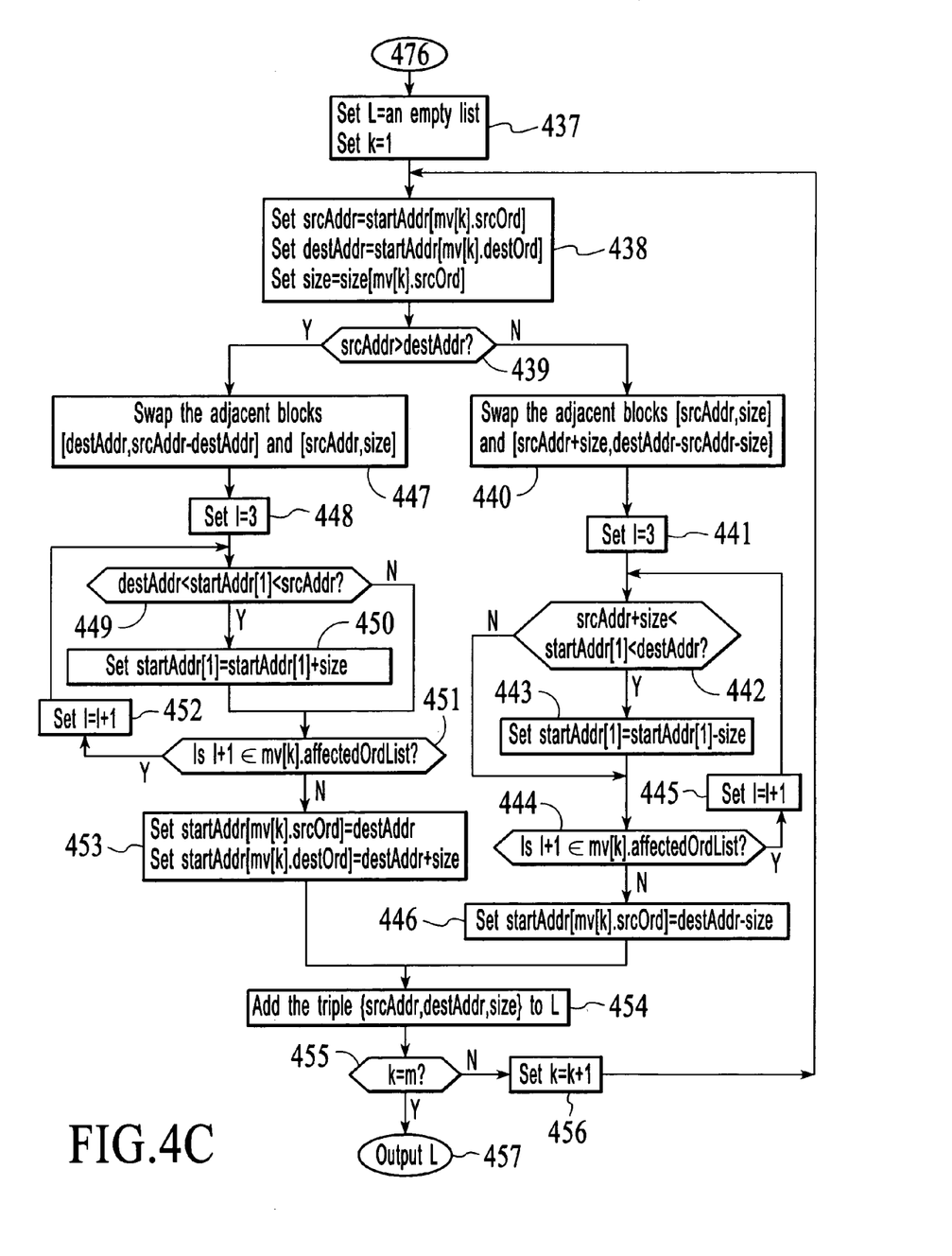

The alignment algorithm of an embodiment makes use of the general structure of the sorting algorithm to reduce file changes introduced by code block swaps between two different versions of an electronic file. FIGS. 4A, 4B, and 4C form a flow diagram of an alignment algorithm 400 for use in reducing file changes introduced by code block swaps between two different versions of an electronic file, under the embodiment of FIGS. 2 and 3.

The alignment algorithm 400 of an embodiment generally includes, with reference to FIG. 2 and FIG. 3, three sections, but is not so limited. A first section of the alignment algorithm 400 including blocks 402–428 performs functions of the sorting algorithm as described above and, as such, sorts the code blocks, and generates a largest increasing subsequence of code blocks (corresponds to block 204, FIG. 2). A second section of the alignment algorithm 400 including blocks 429–436 generates lists that include the original order numbers of code blocks that are affected by code block movements (corresponds to block 206, FIG. 2). A third section of the alignment algorithm 400 including blocks 437–457 of the alignment algorithm moves code blocks of the original file according to the largest increasing subsequence of code blocks so that the code blocks of the original file are in the same order as the counterpart code blocks in the new file (corresponds to block 208, FIG. 2). The alignment algorithm 400 further generates a list that includes encoded information of the code block moves and outputs the list, where the list is referred to as the triple list.

In describing the alignment algorithm 400 below, reference is made to five arrays, including mapping[1, . . . , n], member[1, . . . , n], startAddr[1, . . . , n], size[1 . . . , n], and ord[1, . . . , n]. Further, reference is made to a data structure for block movement. These five arrays and the data structure for block movement are each described in turn.

In describing the array mapping[1, . . . , n], consider the following table of code blocks as an example:

| Index | startAddrV1 | sizeV1 | startAddrV2 | sizeV2 |
|-------|-------------|--------|-------------|--------|
| 1     | 0x8040      | 0x30   | 0x8060      | 0x30   |
| 2     | 0x8070      | 0x80   | 0x88a6      | 0x80   |
| 4     | 0x8106      | 0x568  | 0x8090      | 0x568  |

This table indicates an example where an original file version V1 and a new file version V2 include common code blocks, represented by index values 1, 2, and 4. In this table, startAddress is generally defined as the starting address of the corresponding function unit; therefore "startAddressV1" is the startAddress of a code block of the original file V1 and "startAddressV2" is the startAddress of a code block of the new file V2. Likewise, "sizeV1"represents the size of a code block of the original file V1 and "sizeV2" represents the size of a code block of the new file V2.

As shown in the table, the code blocks of the new file V2 represented by indices 2 and 4 are out of order because the start address of the index 2 code block is larger than the start address of the index 4 code block. Assuming, then, that the code blocks of the original file V1 are in ascending order, as indicated by their start addresses, the alignment algorithm 400 is called by components of the file differencing and updating system to reorder the code blocks of the original file V1 so that they are aligned with the counterpart code blocks of the new file V2, thereby reducing the file changes introduced by the code block swap between the two versions V1 and V2.

Given n blocks in the new file V2, where the new file V2 is represented by an index table similar to the table of the above example, a sorting algorithm is called to sort the blocks in ascending order of their start addresses. The code blocks of the new file V2 are represented as block 1, 2, . . . , n in the order in which they are sorted. The uniqueness of the index value across versions is used to establish a mapping between the blocks of the original V1 and the new V2 files in terms of the block numbers. This mapping is defined in an array mapping[1, . . . , n]. If block j of the original file V1 corresponds to block k of new file V2, then set mapping[j]=k where j=1, 2, . . . , n, and k is also a unique number between 1 and n. This definition therefore provides mapping[1]=1, mapping[2]=3 and mapping[3]=2 for the original file V1 code blocks shown in the index table above.

In describing the array memory[1, . . . , n], and continuing with the example above, the Naïve Cover Algorithm and LIS Algorithm are applied to the array mapping[1, . . . , n] to generate the LIS of the array mapping[1, . . | . , n]. The membership of the LIS for each block of the original file V1 is then identified, and the array member[1, . . . , n] defines this membership. If mapping[j] is a member of the LIS, set member[j]=1, otherwise set member[j]=0.

As an example, and returning to the example described above with reference to the Naïve Cover Algorithm in which

L={5, 6, 2, 3, 4, 1, 10, 12, 11, 13, 14, 16, 15, 18, 17, 29, 30, 22, 24, 25, 26} and

I={2, 3, 4, 10, 12, 13, 14, 16, 18, 22, 24, 25, 26}, where L includes 21 integers. Therefore, there are 21 elements of member[1, . . . , 21 ]. The LIS of L is I, so the elements of member[1, . . . ,21 ] are as follows:

{0, 0, 1, 1, 1, 0, 1, 1, 0, 1, 1, 1, 0, 1, 0, 0, 0, 1, 1, 1, 1}.

Regarding the array startAddr[1, . . . , n] and the array size[1, . . . , n], the alignment algorithm 400 of an embodiment uses these two arrays to record the start addresses and sizes of the code blocks of the original file V1 , respectively. Also, because the alignment algorithm 400 dynamically changes the code block order of the original file V1 , an array ord[1, . . . , n] stores the original order of code blocks in the original version V1 in order to access the arrays startAddr[1, . . . , n] and size[1, . . . , n]. The array ord[1, . . . ,n] is referred to as the original order number array.

In addition to the five arrays, the alignment algorithm 400 includes a data structure for block movement, but is not so limited. The data structure is defined using the attributes "srcOrd", "destOrd", and "affectedOrdList". The notation "srcOrd" refers to the original order number of the block to be moved. The notation "destOrd" refers to the original order number of the block on front of which a block will be moved. The notation "affectedOrdList" refers to a list of original order numbers of blocks that will be affected by the movement. A specific movement is denoted as "mv", with "mv.srcOrd", "mv.destOrd" and "mv.affectedOrdList" representing the attributes of the movement.

Figure 5:
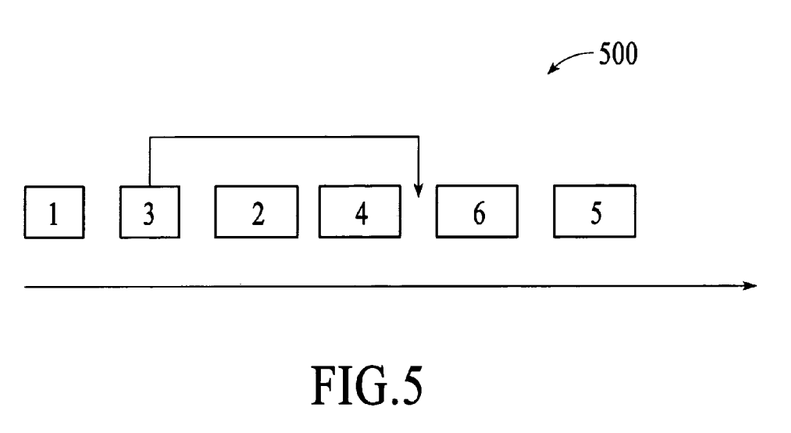
FIG. 5 is a block diagram example of a code block movement, under an embodiment.

FIG. 5 is a block diagram example 500 of a code block movement, under an embodiment, provided to demonstrate the data structure attributes. In this example 500, the code block movement moves code block 3 to a new location between code blocks 4 and 6, where the numbers inside each code block are the original order numbers. Consequently, srcOrd=3, destOrd=6 and affectedOrdList={3,2,4}.

Returning to FIGS. 4A, 4B, and 4C, these figures form a flow diagram of an alignment algorithm 400 for use in reducing file changes introduced by code block swaps between two different versions of an electronic file. Operation of the alignment algorithm 400 begins with the receipt of input information, at block 401. The input information is in the format mapping[1, ..., n], member[1, ..., n], startAddr [1, ..., n], size[1 ..., n]

as described above, but is not so limited. The alignment algorithm 400 sets ord[j]=j where j=1, ..., n, at block 402, and initializes counter m=0, at block 403. The alignment algorithm 400 next searches for the smallest k such that member[ord[k]]=0, at block 404. When the smallest k is not found such that member[ord[k]]=0, operation proceeds to generate lists of original order numbers of code blocks that are affected by code block movements, at block 429 as described below.

When the smallest k is found such that member[ord[k]]=0, operation proceeds to sort code blocks, at block 405. The alignment algorithm 400 sets j=1 and temp=0, at block 405. If mapping[ord[j]]=1 and mapping[ord[k]] is less than mapping[ord[j]], at block 406, then set m=m+1 at block 407, and set mv[m].srcOrd=ord[k], mv[m].destOrd=ord[j], member[ord[k]]=1, and temp=ord[k], at block 408.

If k is greater than j, at block 409, set s=k−1 at block 415, set ord[s+1]=ord[s] where s=k−1, ..., j, at block 416, and set ord[j]=temp at block 438. When k is not found to be greater than j at block 409, set s=k+1 at block 410, set ord[s−1]=ord[s] where s=k+1, ..., j−1, at block 411, and set ord[j−1]=temp at block 414. The operations of blocks 404–418 are repeated for all values of j from 1 to n.

Upon completing the operations of blocks 404–418 for all values of j, operation proceeds to search for the largest integer t with member[ord[t]]=1, at block 421. The alignment algorithm 400 then sets m=m+1 at block 422, and sets mv[m].srcOrd=ord[k], mv[m].destOrd=ord[t], member[ord[k]]=1, and temp=ord[k], at block 423. The alignment algorithm also sets ord[s−1]=ord[s] where s=k+1, ..., t, at block 425, and sets ord[t]=temp, at block 428. Operation then returns to block 404 and proceeds as described above until all code blocks are sorted and the LIS is generated, as indicated by the inability to find the smallest k such that member[ord[k]]=0, at block 404.

Following sorting of all code blocks and generation of the LIS, the alignment algorithm 400 proceeds to begin generating lists of original order numbers of code blocks that are affected by code block movements, at block 429. The alignment algorithm 400 sets k=1, at block 429, and adds mv[k].srcOrd and mv[k].destOrd to the list mv[k].affectedOrdList, at block 430.

The alignment algorithm 400 sets j=k+1 at block 431. Subsequently, mv[j].srcOrd and mv[j].destOrd are added to the end of mv[k].affectedOrdList if they are not in the list mv[k].affectedOrdList, at block 432. A determination is made whether j=m, at block 433. If j does not equal m, the value of j is incremented by one, at block 434, and operation returns to block 432 as described above. The operations of blocks 432–434 are repeated for all values of j from k+1 to m.

When j=m, at block 433, operation proceeds to block 435 where a determination is made whether k=m. If k does not equal m, operation returns to block 430 and proceeds as described above. The operations of blocks 430–435 are repeated for all values of k from 1 to m. When k=m at block 435, generation of the list of original order numbers of code blocks that are affected by code block movement is complete.

Subsequent to generation of lists of original order numbers of code blocks that are affected by code block movements, the alignment algorithm 400 moves the code blocks according to the LIS. As such, operation proceeds to block 437, where the alignment algorithm 400 sets L=an empty list, and sets k=1 where L represents a triple list as described above. The alignment algorithm 400 next sets srcAddr=startAddr[mv[k].srcOrd], sets size= size[mv[k].srcOrd], and sets destAddr=startAddr[mv[k].destOrd], at block 438. If srcAddr is greater than destAddr, at block 439, then the alignment algorithm 400 swaps the adjacent blocks [destAddr, srcAddr−destAddr] and [srcAddr, size], at block 447, and sets variable l=3, at block 448.

A determination is next made whether startAddr[1] falls between destAddr and srcAddr, at block 449. When startAddr[1] does fall between destAddr and srcAddr, the alignment algorithm 400 sets startAddr[1]=startAddr[1]+size for all numbers, at block 450, and proceeds to make a determination whether l+1∈mv[k].affectedOrdList, at block 451. When startAddr[1] does not fall between destAddr and srcAddr, at block 449, the alignment algorithm 400 proceeds instead to make the determination whether l+1∈mv[k].affectedOrdList, at block 451. When l+1∈mv[k].affectedOrdList is satisfied, at block 451, the value in the variable l is incremented at block 452, and operation returns to block 449 to evaluate another block start address as described above.

When l+1∈mv[k].affectedOrdList is not satisfied, at block 451, the alignment algorithm 400 sets startAddr[mv[k].srcOrd]=destAddr, and sets startaddr[mv[k].destOrd]=destAddr+size, at block 453, and appends the triple {srcAddr, destAddr,size} onto the end of the triple list L, at block 454.

Returning to block 439, if srcAddr is found to be greater than destAddr, then the alignment algorithm 400 swaps the adjacent blocks [srcAddr,size] and [srcAddr+size,destAddr−srcAddr−size], at block 440, and sets variable l=3 at block 441. A determination is next made whether startAddr[1] falls between srcAddr+size and destAddr, at block 442. When startAddr[1] does fall between srcAddr+size and destAddr, the alignment algorithm 400 sets startAddr[1]=startAddr[1]+size, at block 443, and proceeds to make a determination whether l+1∈mv[k].affectedOrdList, at block 444. When startAddr[1] does not fall between srcAddr+size and destAddr, at block 442, the alignment algorithm 400 proceeds instead to make the determination whether l+1∈mv[k].affectedOrdList, at block 444.

When l+1∈mv[k].affectedOrdList is satisfied, at block 444, the value in the variable l is incremented at block 445, and operation returns to block 442 to evaluate another block start address as described above. When l+1∈mv[k].affectedOrdList is not satisfied, at block 444, the alignment algorithm 400 sets startAddr[mv[k].srcOrd]=destAddr−size, at block 446, and appends the triple {srcAddr,destAddr,size} onto the end of the triple list L, at block 454.

A determination is made whether k=m, at block 455. If k does not equal m, the value of k is incremented by one, at block 456, and operation returns to block 438 as described above. Therefore, the operations of blocks 438–454 are repeated for all values of k from 1 to m. Upon determining that all code block moves are complete, at block 455, the alignment algorithm 400 outputs the triple list L, at block 457. The triple list L of an embodiment is provided to a file updating engine along with the delta file, but is not so limited.

An analysis of the alignment algorithm 400 is now described in terms of time complexity in order to show the increase in performance of file updates when using the alignment algorithm 400 of an embodiment. As described above, the alignment algorithm 400 of an embodiment includes three sections, but is not so limited. With reference to FIG. 4, the first section sorts the code blocks, and generates a largest increasing subsequence of code blocks (blocks 402–428). The second section generates lists that include the original order numbers of code blocks that are affected by code block movements (blocks 429–436). The third section moves code blocks of the original file according to the largest increasing subsequence of code blocks so that the code blocks of the original file are in the same order as the counterpart code blocks in the new file (blocks 437–457). The time complexity of each of these three sections of the alignment algorithm 400 is described below.

In evaluating the time complexity of the first section of the alignment algorithm 400, the time complexity of the Naïve Cover Algorithm is $O(n \cdot n)$. At any point during execution of the Naïve Cover Algorithm, let L be the ordered list including the last integer of each of the decreasing subsequences built to this point in the processing. The list L is in increasing order at any select time during processing by the alignment algorithm 400, so a binary search can be used to identify the first decreasing subsequence to extend for each integer. As the binary search has time complexity $O(\log(n))$, the overall time complexity for the improved Naïve Cover Algorithm with the binary search is $O(n \log(n))$.

Continuing, the time complexity for the LIS Algorithm is $O(n)$. Assuming the total number of non-LIS members is m, then the time complexity of the first section of the alignment algorithm 400, the sorting algorithm, is $O(n \cdot m)$.

In evaluating the time complexity of the second and third sections of the alignment algorithm 400, assume that m is the total number of code block moves (it is also the total number of non-LIS integers). This leads to a time complexity of $O(m \cdot m)$ for both the second and third sections of the alignment algorithm 400. Adding the time complexities for each of the three sections results in an overall time complexity of $O(n \cdot m)$ for the alignment algorithm 400, since m is less than n.

In practice, the value of m is typically much less than the value of n so that $O(n \cdot m)$ is almost equivalent to $O(n)$ plus a large constant. Therefore, the total time cost for the alignment algorithm 400 is $O(n \log(n))+O(n \cdot m)$, as compared to an approximate time cost of $O(n \log(n))$ with typical quick sorting algorithms.

While the quick sorting algorithms might perform in slightly less time than the alignment algorithm 400 of an embodiment, these quick sorting algorithms make little to no attempt to minimize the number of code block movements. As such, use of quick sorting algorithms results in a much larger number of code block movements, and therefore a very large triple list having a size on the order of $O(n \log(n))$. This large triple list presents problems, as described above, when transmitted over low bandwidth communication channels.

In contrast, the alignment algorithm 400 of an embodiment significantly reduces the number of code block movements, thereby reducing the size of the triple list to a size on the order of m. Because the triple list is transmitted over low bandwidth communication channels, the relatively small triple list provided by the alignment algorithm 400 supports transmission to mobile devices while reducing/eliminating the problems described above with transmission of large files via low bandwidth channels.

As an example of a file differencing engine that makes use of the alignment algorithm 400 described above, FIG. 6 is a block diagram of a file differencing engine 106, under the embodiment of FIG. 1. The functions of the alignment algorithm 400 described above can be embodied in and/or distributed among any number of components of the file differencing engine 106 and/or the processing system hosting and/or coupled to the file differencing engine 106, but are not so limited.

Figure 6:
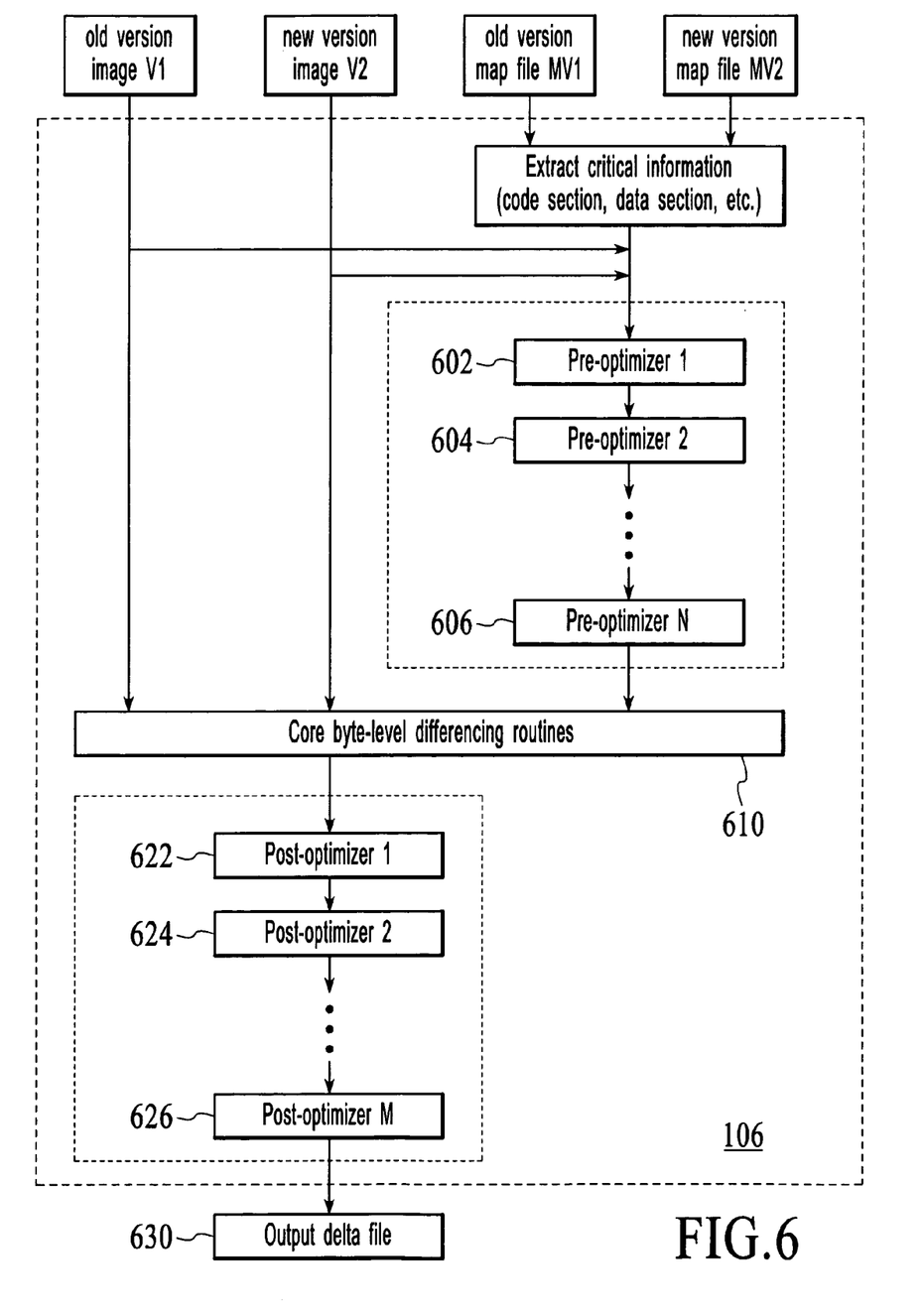
FIG. 6 is a block diagram of a file differencing engine, under the embodiment of FIG. 1.

Generally, and with reference to FIG. 1 and FIG. 6, the first communication system 102 receives an original version V1 and a new version V2 of an electronic file. The original version V1 also may be referred to as the old version. The new version V2 is generally an updated or revised version of the original version V1, but is not so limited. The electronic files V1 and V2 include software files including dynamic link library files, shared object files, embedded software components (EBSCs), firmware files, executable files, data files including hex data files, system configuration files, and files including personal use data, but are not so limited. The map files M V1 and MV2 corresponding to the original V1 and new V2 versions are also received. The map files include high-level text files that include the start address and size of each symbol of a corresponding software image, with symbol examples including function and global variables. The map files are output by compiler/linker utilities, and are also known as log files, symbol files, and/or list files.

Components of the file differencing engine 106 receive the new version V2, compare it to the original version V1, and calculate the differences between the compared files, as described below. These differences include byte-level differences between the compared files, but are not so limited. The file differencing engine 106 of an embodiment generates and outputs a difference file 630, also referred to as a delta file 630, during the comparison.

The components of the file differencing engine 106 of an embodiment include at least one pre-optimizer system 602–606, at least one differencing system 610, and at least one post-optimizer system 622–626, as described in the Related Applications. The pre-optimizer systems 602–606, differencing systems 610, and post-optimizer systems 622–626 include at least one processor running under control of at least one pre-optimizer, differencing, and post-optimizer algorithm, program, or routine, respectively.

The optimizers of an embodiment are generally classified as pre-optimizers and post-optimizers according to when they process information relative to the differencing operation, as described above, but are not so limited. These optimizers are optional, independent, and additive, as appropriate to the architecture and footprint of the system in which they are components. Therefore, some optimizers may be removed from the differencing engine when used in smaller computing systems, for example mobile electronic devices. Further, the optimizers are configurable before the file differencing engine is started. The optimizers take advantage of domain knowledge and are customized to improve the overall performance of the file differencing engine.

Contents of the delta file 630 provide an efficient representation of the differences between the new version V2 and the original version V1. The delta file 630 includes metadata along with actual data of replacement and/or insertion operations that represent the differences between the new or current version of the associated file and previous versions of the file, as described in the Related Applications, but is not so limited.

Calculation of the byte-level differences includes calculating edit distances between the compared files and generating an operation array, but is not so limited. The file differencing algorithm of an embodiment calculates the edit distances between the compared files and generates the operation array. The edit distance between two byte streams, as described by the Gusfield reference, is the minimum number of edit operations needed to transform the original byte stream into the new byte stream.

The differences between an original file and a new file are typically smaller than the new file, leading to significant storage and transmission savings if the differences are transmitted and stored instead of the entire new file. This is particularly important for mobile electronic devices (client devices) hosting programs that are updated via connections that typically can be slow and expensive, for example wireless or cellular connections. The reduced size of the delta file provides numerous improvements, one of which includes a reduction in bandwidth required for transmission of the delta file to the client device; the smaller file means less bandwidth is required for the transfer. Also, smaller files require less time for transmission and, therefore, decrease the probability that the file transfer will be interrupted and simultaneously reduce transmission errors in the received file. In addition, it is safer to transmit the delta files than the new software images via a non-secure connection. All of these improvements increase customer satisfaction.

As an example of a device and/or system using the differencing and updating engines and alignment algorithm described above, the computing devices receiving and using the delta file may be client devices that host corresponding software applications in need of updating, for example cellular telephones, mobile electronic devices, mobile communication devices, personal digital assistants, and other processor-based devices. This support is provided for all mobile device software ranging from firmware to embedded applications by enabling carriers and device manufacturers to efficiently distribute electronic file content and applications via their wireless infrastructure.

Another example of systems that benefit from the differencing and updating engines and the alignment algorithm described above includes systems using wired serial connections to transfer the delta file from a device hosting the file differencing engine to a device hosting the file updating engine. These systems typically have slow transfer rates and, because the transfer rates are slow, a reduction in the size of the delta file is a way to realize faster transfer times.

Yet another example of systems that benefit from use of the differencing and updating engines and alignment algorithm includes wireless systems using radio communications to transfer the delta file from a device hosting the file differencing engine to a device hosting the file updating engine. While suffering from low reliability associated with the wireless connections, these systems also have slow transfer rates. The use of a smaller delta file in these systems provides several advantages. For example, the smaller file size results in a faster delta file transfer time. The faster transfer time, while saving time for the device user, reduces the opportunity for the introduction of errors into the delta file, thereby increasing system reliability. Also, with cellular communications, the reduced transfer time results in a cost savings for the consumer who is typically charged by the minute for service.

As another advantage, the smaller delta file reduces the bandwidth required to transfer the delta files to client devices. The reduced bandwidth allows for the support of more client devices via the allocated channels. As with the reduced transfer time, this too results in a reduction in operating costs for the wireless service provider.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, shall refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the file differencing and updating systems described above.

The elements and acts of the various embodiments described above can be combined to provide further embodiments. These and other changes can be made to the invention in light of the above detailed description.

All of the above references and United States patents and patent applications are incorporated herein by reference. Aspects of the embodiments described herein can be modified, if necessary, to employ the systems, functions and concepts of the various patents and applications described above to provide yet further embodiments of the differencing and updating system.

In general, in the following claims, the terms used should not be construed to limit the differencing and updating system to the specific embodiments disclosed in the specification and the claims, but should be construed to include all processing systems that operate under the claims to provide file differencing and/or updating. Accordingly, the differencing and updating system is not limited by the disclosure, but instead the scope of the differencing and updating system is to be determined entirely by the claims.

While certain aspects of the differencing and updating system are presented below in certain claim forms, the inventors contemplate the various aspects of the differencing and updating system in any number of claim forms. For example, while only one aspect of the differencing and updating system is recited as embodied in computer-readable medium, other aspects may likewise be embodied in computer-readable medium. Accordingly, the inventors reserve the right to add additional claims after filing the application to pursue such additional claim forms for other aspects of the differencing and updating system.

What we claim is:

1. A method for reducing a number of changes between an original file and a new file on a processor-based device, comprising:
    determining an order of code blocks of the new file using index values;
    sorting code blocks of the original file and generating a largest increasing subsequence (LIS) of code blocks according to the index values;
    generating at least one list of original order numbers of the code blacks of the original file affected by code block movement; and
    moving the code blocks of the original file to locations in the original file according to the largest increasing subsequence of code blocks, wherein the code blocks of the original file are aligned in the same order as code blocks of the new file.

2. An apparatus comprising at least one processor coupled to:
    means for receiving an original file and a new file, wherein the new file includes an updated version of the original file;
    means for determining an order of code blocks of the new file using index values;
    means for sorting code blocks of the original file and generating a largest increasing subsequence (LIS) of code blocks according to the index values;
    means for generating lists of original order numbers of the code blocks of the original file affected by code block movements; and
    means for moving the code blocks of the original file to locations in the original file according to the largest increasing subsequence of code blocks, wherein the code blocks of the original file are aligned in the same order as code blocks of the new file.

3. A system for updating electronic files of remote devices, comprising:
    a first device including a processor coupled to a file differencing engine that generates differences between an original version and a new version of an electronic file by:
        determining an order of code blocks of the new version using index values;
        sorting code blocks of the original version and generating a largest increasing subsequence (LIS) of code blocks according to the index values;
        generating lists of original order numbers of the code blocks of the original version affected by code block movements;
        moving the code blocks of the original version to locations in the original version according to the largest increasing subsequence of code blocks, wherein the code blocks of the original version are aligned in the saint order as code blocks of the new version;
        generating an encoded list including information of the code block moves;
        transmitting the encoded list to a second device; and
    a file updating engine coupled to a processor of the second device, the file updating engine generating a copy of the new version using a difference file and information of the code block moves.

4. The system of claim 3, wherein the second device includes at least one of cellular telephones, portable communication devices, personal digital assistants, personal computers, and portable processor-based devices.

5. A method for generating difference flies on a processor-based device, comprising:
    receiving an original file and a new file, wherein the new file includes an updated version of the original file;
    determining an order of code blocks of the new tile using index values;
    sorting code blocks of the original file and generating a largest increasing subsequence (LIS) of code blocks according to the index values;
    generating lists of original order numbers of the code blocks of the original file affected by code block movements;
    moving the code blocks of the original file to locations in the original file according to the largest increasing subsequence of code blocks, wherein the code blocks of the original file are aligned in the same order as code blocks of the new file; and
    generating an encoded list including information of the code block moves.

6. The method of claim 5, farther comprising:
    generating mappings between code blocks of the original file and corresponding code blocks of the new file; and
    generating a mapping array using information of the mappings.

7. The method of claim 6, further comprising:
    generating a longest increasing subsequence (LIS) of the mapping array;
    identify membership of the LIS for each code block of the original file; and
    generating a membership array using information of the LIS membership.

8. The method of claim 5, further comprising receiving at least one of a mapping array, a membership array, a start address array, a size array, and an original code block order number array, wherein the mapping array includes information of mappings between code blocks of the original file and corresponding code blocks of the new file, wherein the membership array includes information of a membership of a longest increasing subsequence (LIS) for each code block of the original file, wherein the start address array includes information of code block start addresses, wherein the size ray includes information of code block sizes, and wherein the original code block order number array includes information of the original order of code blocks in the original file prior to the code block movements.

9. The method of claim 5, further comprising:

transferring the encoded list to at least one remote system via at least one coupling, wherein the remote system includes at least one processor-based system, wherein the coupling includes at least one of a wireless coupling, a wired coupling, and a hybrid wireless/wired coupling; and updating a hosted copy of the original file in the remote processing systems using a difference file and the encoded list.

10. A computer readable medium including executable instructions which, when executed in a processing system, reduce a number of changes between an original file and a new file by:

determining an order of code blocks of the new file using index values;

sorting code blocks of the original file and generating a largest increasing subsequence (LIS) or code blocks according to the index values;

generating lists of original order numbers of the code blocks of the original file affected by code block movements; and moving the code blocks of the original file to locations in the original file according to the largest increasing subsequence of code blocks, wherein the code blocks of the original file are aligned in the same order as code blocks of the new file.

* * * * *